United States Patent
Huang et al.

(10) Patent No.: US 8,380,968 B2
(45) Date of Patent: Feb. 19, 2013

(54) OVERCLOCKING CONTROL DEVICE AND OVERCLOCKING CONTROL METHOD

(75) Inventors: Pai-Ching Huang, Taipei (TW); Li-Chien Wu, Taipei (TW)

(73) Assignee: Asustek Computer Inc., Taipei (TW)

( * ) Notice: Subject to any disclaimer, the term of this patent is extended or adjusted under 35 U.S.C. 154(b) by 489 days.

(21) Appl. No.: 12/685,228

(22) Filed: Jan. 11, 2010

(65) Prior Publication Data

US 2010/0223489 A1    Sep. 2, 2010

(30) Foreign Application Priority Data

Feb. 27, 2009 (TW) ................................ 98106594 A

(51) Int. Cl.
 G06F 9/00 (2006.01)
 G06F 9/24 (2006.01)
 G06F 15/177 (2006.01)
(52) U.S. Cl. .......................................................... 713/1
(58) Field of Classification Search .............. 713/1, 500
 See application file for complete search history.

(56) References Cited

U.S. PATENT DOCUMENTS

| | | | | |
|---|---|---|---|---|
| 7,996,702 | B2 * | 8/2011 | Xue et al. ...................... | 713/501 |
| 2005/0144498 | A1 | 6/2005 | Lin | |
| 2007/0112989 | A1 * | 5/2007 | Iwaki ............................. | 710/303 |
| 2007/0129828 | A1 * | 6/2007 | Lee et al. ........................ | 700/94 |
| 2007/0283176 | A1 * | 12/2007 | Tobias et al. .................. | 713/322 |
| 2008/0077723 | A1 * | 3/2008 | Lee ................................ | 710/261 |
| 2008/0098246 | A1 * | 4/2008 | Kim .............................. | 713/323 |
| 2009/0077410 | A1 * | 3/2009 | Lin et al. ....................... | 713/600 |

FOREIGN PATENT DOCUMENTS

| | | |
|---|---|---|
| CN | 1357808 A | 12/2000 |
| CN | 1670691 | 9/2005 |
| CN | 101303655 | 11/2008 |

OTHER PUBLICATIONS

Gigabyte EasyTune 5, 2004 Giga-Byte Technology Co., Ltd., Retrieved from Internet<http://www.gigabyte.com/MicroSite/121/tech_20041125_px_et5.htm> (cited by Taiwan Patent Office on Oct. 15, 2012).

* cited by examiner

*Primary Examiner* — Mohammed Rehman
(74) *Attorney, Agent, or Firm* — Muncy, Geissler, Olds & Lowe, PLLC

(57) ABSTRACT

An overclocking control method cooperates with an overclocking application of a computer system when the overclocking application is started. The overclocking control method includes the steps as follows. A BIOS enters an overclocking mode according to an executing state of the overclocking application. The BIOS receives a first triggering signal outputted from a south bridge chip, and the first triggering signal is generated by the south bridge chip according to a first button of the computer system. The BIOS selects a piece of corresponding overclocking information from a look-up table and loads the overclocking information into a register of the BIOS according to the first triggering signal to control the overclocking of the computer system.

8 Claims, 4 Drawing Sheets

OVERCLOCKING CONTROL DEVICE AND OVERCLOCKING CONTROL METHOD

CROSS REFERENCE TO RELATED APPLICATIONS

This Non-provisional application claims priority under 35 U.S.C. §119(a) on Patent Application No(s). 098106594 filed in Taiwan, Republic of China on Feb. 27, 2009, the entire contents of which are hereby incorporated by reference.

BACKGROUND OF THE INVENTION

1. Field of Invention

The invention relates to an overclocking control device and an overclocking control method and, more particularly, to an overclocking control device and an overclocking control method which may use a power button and a reset button to control the overclocking of a computer system.

2. Related Art

A computer is invented to assist human in calculating at the earliest. After invented, the function of the computer is enhanced continually, and after continuous evolution, the computer nowadays has functions such as fast calculating, storing a great deal of data and determining and controlling information.

The development of the computer goes through the vacuum tube element period, the transistor element period, the integrated circuit (IC) period and the microprocessor unit (MPU) period. In each period, significant progress is made in the processing performance.

In the computer, a working voltage and a communicating frequency are important factors related to the processing performance. However, to meet the security regulation requirement to allow the computer to work in the safest mode, operating parameters of elements in the computer are usually set below safety values, respectively, to ensure that the elements are not overloaded. That is, the elements in the computer do not work with whole efficiency.

The parameters affecting the working efficiency of the elements are mainly the working frequency and the working voltage. The parameters may be adjusted via a basic input/output system (BIOS) of the computer to increase the working performance of the computer, which is the so-called overclocking.

Currently, in the general overclocking method, specific software is executed under an operating system (OS) of the computer, and adjustment may be made for some elements (such as a peripheral component interconnect (PCI), a PCI-Express (PCIE), a central processing unit (CPU) or a memory) and parameters (such as the working frequency or the working voltage) via an operation interface provided by the software to achieve the overclocking objective. Thus, only when the user is familiar with the parameter ranges of the elements, he may make the computer work normally. In the method, the adjusting steps are complex, so the uncertainty may be caused in the operation of the computer.

SUMMARY OF THE INVENTION

The invention discloses an overclocking control device and an overclocking control method in a computer system which may achieve an overclocking function easily.

According to a feature of the invention, the overclocking control method cooperates with an overclocking application of a computer system when the overclocking application is started. The control method includes steps as follows. A BIOS enters an overclocking mode according to an executing state of the overclocking application. The BIOS receives a first triggering signal outputted from a south bridge chip, and the first triggering signal is generated by the south bridge chip according to the operation of a first button. The BIOS selects a piece of corresponding overclocking information from a look-up table and loads the overclocking information into a register of the BIOS according to the first triggering signal to control the overclocking of the computer system.

In an embodiment of the invention, after the overclocking application is started, the overclocking information of the look-up table is loaded into a register of the BIOS.

In an embodiment of the invention, the BIOS further receives a second triggering signal outputted from the south bridge chip. The second triggering signal is generated by the south bridge chip according to the operation of a second button.

In the embodiment of the invention, the BIOS further selects a piece of corresponding overclocking information from the look-up table and loads the overclocking information into a register of the BIOS according to the second triggering signal.

According to a feature of the invention, the overclocking control device cooperates with an overclocking application, and the overclocking control device includes a first button, a south bridge chip and a BIOS. The south bridge chip is electrically connected to the first button and generates a first triggering signal according to the operation of the first button. The BIOS is electrically connected to the south bridge chip and has a normal mode and an overclocking mode. When the overclocking application is started to make the BIOS operated in the overclocking mode, the BIOS receives the first triggering signal outputted from the south bridge chip, selects a piece of corresponding overclocking information from a look-up table and loads the overclocking information into a register of the BIOS according to the first triggering signal to control the overclocking the computer system.

In an embodiment of the invention, the overclocking information has at least a piece of working frequency information and a piece of working voltage information.

In an embodiment of the invention, the overclocking control device further includes a second button electrically connected to the south bridge chip, and the south bridge chip generates a second triggering signal according to the operation of the second button.

These and other features, aspects and advantages of the present invention will become better understood with regard to the following description, appended claims, and accompanying drawings.

DETAILED DESCRIPTION OF THE INVENTION

Figure 1:
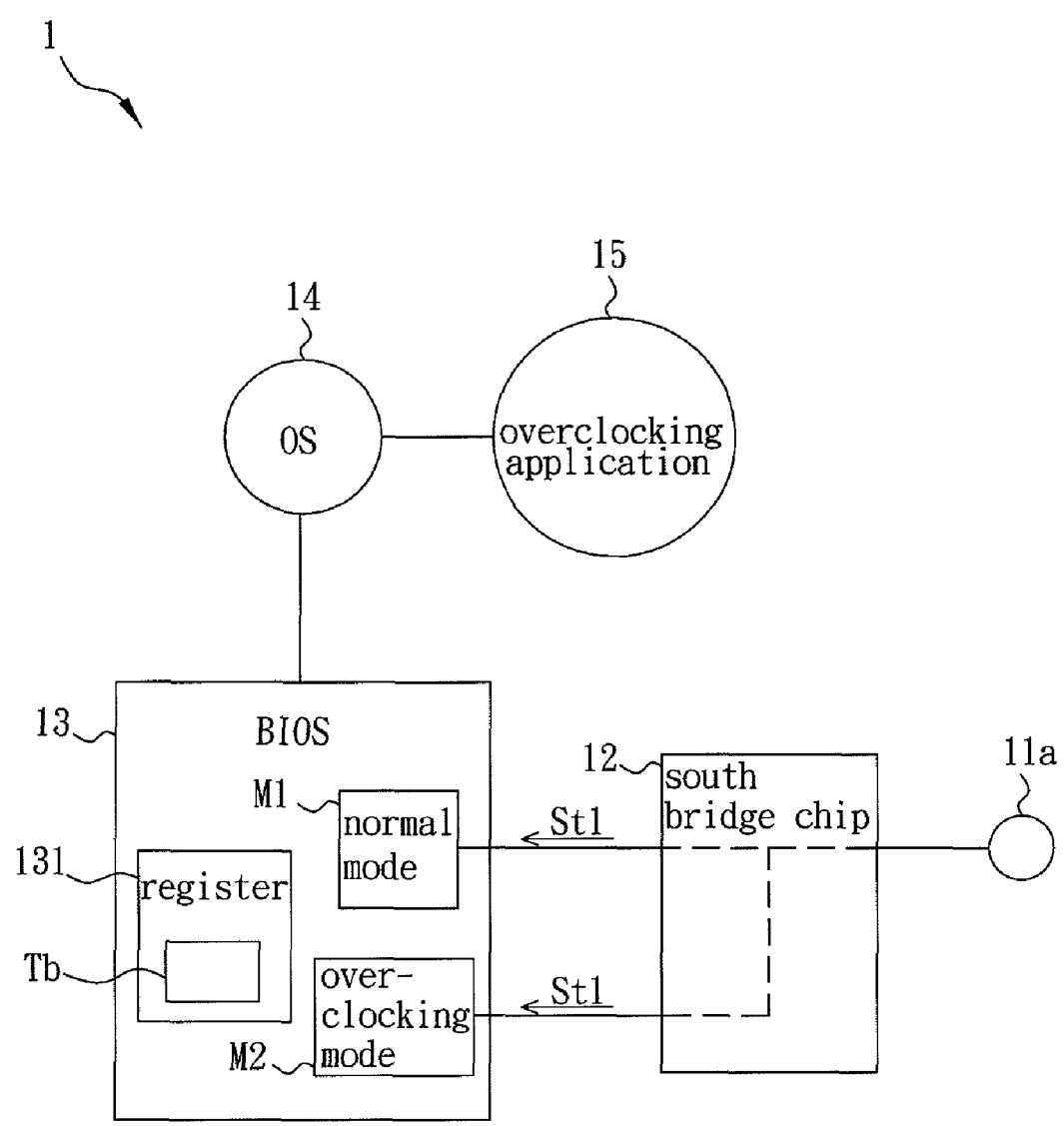
FIG. 1 is a schematic diagram showing the overclocking control device in a preferred embodiment of the invention.

As shown in FIG. 1, an overclocking control device 1 in a preferred embodiment of the invention includes a first button 11a, a south bridge chip 12 and a BIOS 13. The overclocking control device 1 cooperates with an overclocking application 15.

The overclocking application 15 may be executed after the computer system is booted and the OS 14 is started. After the computer system is booted, the user may determine whether to start the overclocking application 15 or not. When the computer is in the normal mode (the overclocking application is not started), if the user directly presses the first button 11a (Ex. power button) or the second button 11b (Ex. reset button) on the computer casing, the signal transmitted by the first button 11a or the second button 11b is transmitted to the BIOS 13 via the south bridge chip 12. Then, the computer system may directly be powered off or reset.

In addition, when the user starts the overclocking application 15, the overclocking function is started. The user may directly press the first button 11a (power button) or the second button 11b (reset button) to control the overclocking of the computer system after the computer system is booted.

In the embodiment, when the user starts the overclocking application 15, the overclocking application 15 may notify the BIOS 13 to enter an overclocking mode. At that moment, a piece of overclocking information in a look-up table Tb is loaded into the BIOS 13. The content recorded in the look-up table Tb includes multiple pieces of overclocking information. The overclocking information has at least a piece of working frequency information and a piece of working voltage information.

The south bridge chip 12 is electrically connected to the first button 11a and generates a first triggering signal St1 according to the operation of the first button 11a. The operation of the first button 11a may be being pressed by the user (for example, the power button on a casing of a desktop computer is pressed by the user). In addition, according to different types of buttons, the first button 11a also may be a touch button.

The BIOS 13 is electrically connected to the south bridge chip 12 and has a normal mode M1 and an overclocking mode M2. When the overclocking application 15 is started and the BIOS 13 works in the overclocking mode M2, the BIOS 13 receives the first triggering signal St1 outputted from the south bridge chip 12, selects the corresponding overclocking information from the look-up table Tb according to the first triggering signal St1 and loads the overclocking information into a register 131 of the BIOS 13. In the embodiment, the corresponding overclocking information is selected according to the number of the receiving times and frequency of the received first triggering signal St1 by the BIOS 13.

In the embodiment, the BIOS 13 may further have a register 131 for storing the loaded overclocking information of the look-up table Tb. Thus, the BIOS 13 may directly select corresponding overclocking information from the look-up table Tb after the BIOS 13 receives the first triggering signal St1 outputted from the first button 11a conveniently. Then, the overclocking information is loaded into the register 131 according to the working frequency information and the working voltage information in the overclocking information to adjust the related parameters of the elements (such as the PCI, or the PCIE or the CPU or the memory) in the computer. Thus, the objective of controlling the overclocking of the computer system is achieved.

Figure 2:
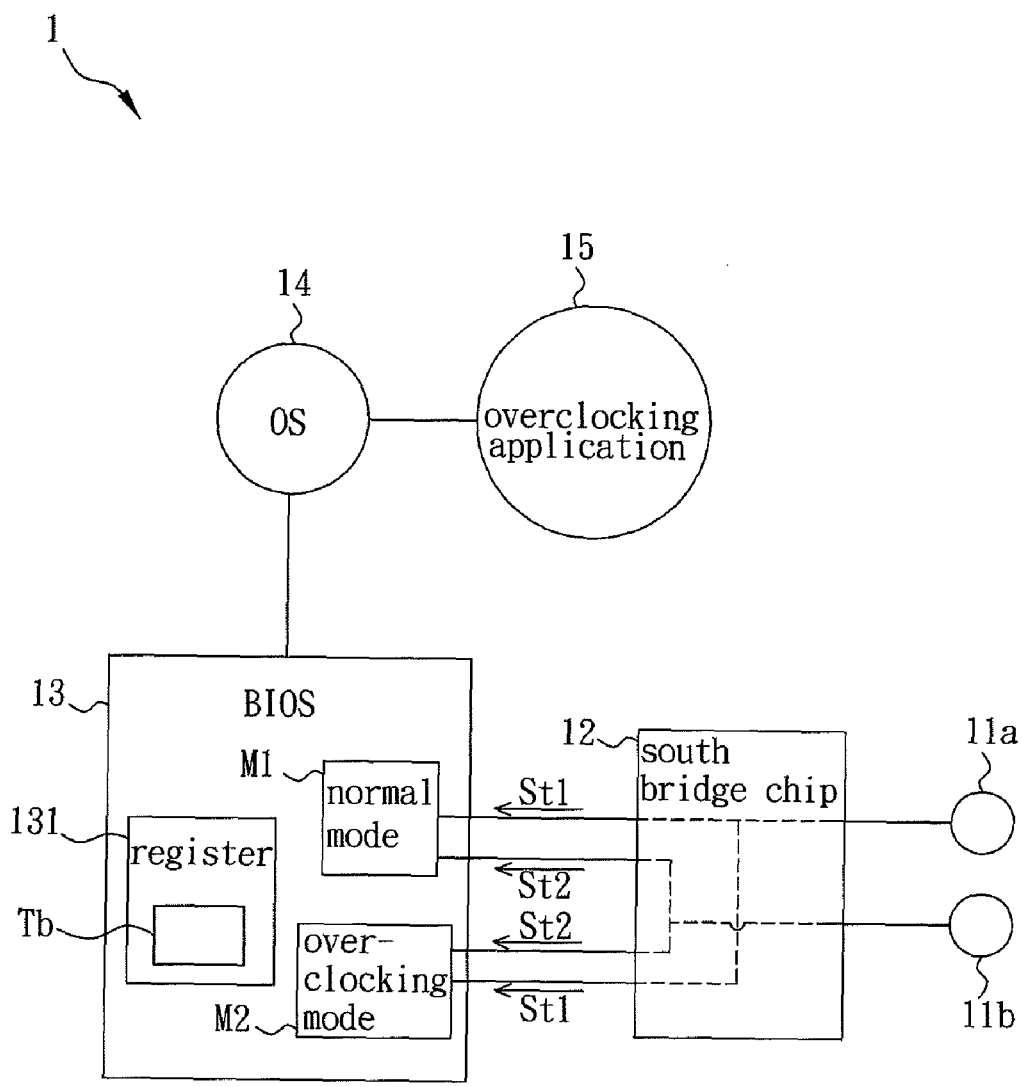
FIG. 2 is a schematic diagram showing the overclocking control device in another preferred embodiment of the invention.

In addition, as shown in FIG. 2, the overclocking control device 1 in the embodiment may further include a second button 11b (such as the reset button on the casing of the desktop computer), and the second button 11b is electrically connected to the south bridge chip 12. The south bridge chip 12 generates a second triggering signal St2 according to the operation of the second button 11b. The BIOS 13 further selects a piece of corresponding overclocking information from the look-up table Tb according to the second triggering signal St2 and outputs the overclocking information into the register 131 of the BIOS 13.

In the embodiment, when the computer system is booted and the overclocking mode is entered, the user may press the first button 11a (power button) and the second button 11b (reset button) to control the overclocking of computer system. When the user presses the first button 11a (power button), the BIOS 13 selects the overclocking information from the look-up table Tb according to the first triggering signal St1. For example, the user may press the first button 11a to select the next overclocking information and press the second button 11b to select the previous overclocking information. However, these are only examples, and the invention is not limited thereto.

In addition, the first button 11a may be the power button of the computer, and the second button 11b may be the reset button of the computer. However, these are also examples, and the invention is not limited thereto. In addition, the first triggering signal St1 and the second triggering signal St2 are outputted to the BIOS 13 via general purpose input/output (GPIO) pins of the BIOS 13.

Figure 3:
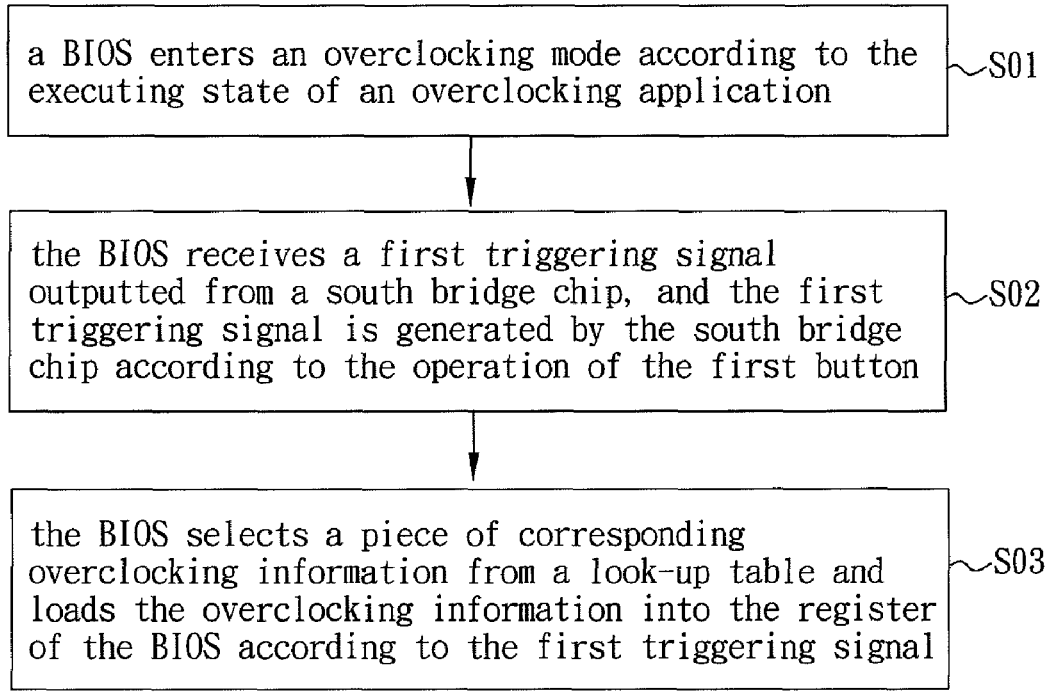
FIG. 3 is a flow chart showing the overclocking control device in a preferred embodiment of the invention.

As shown in FIG. 3 and the former embodiments, the overclocking control method in a preferred embodiment of the invention cooperates with the overclocking application when the overclocking application is started. The control method includes the steps S01 to S03.

In step S01, the BIOS enters the overclocking mode according to the executing state of the overclocking application.

In step S02, the BIOS receives the first triggering signal outputted from the south bridge chip. The first triggering signal is generated by the south bridge chip according to the operation of the first button.

In step S03, the BIOS selects the corresponding overclocking information from the look-up table according to the first triggering signal and loads the overclocking information into a register of the BIOS to control the overclocking.

Figure 4:
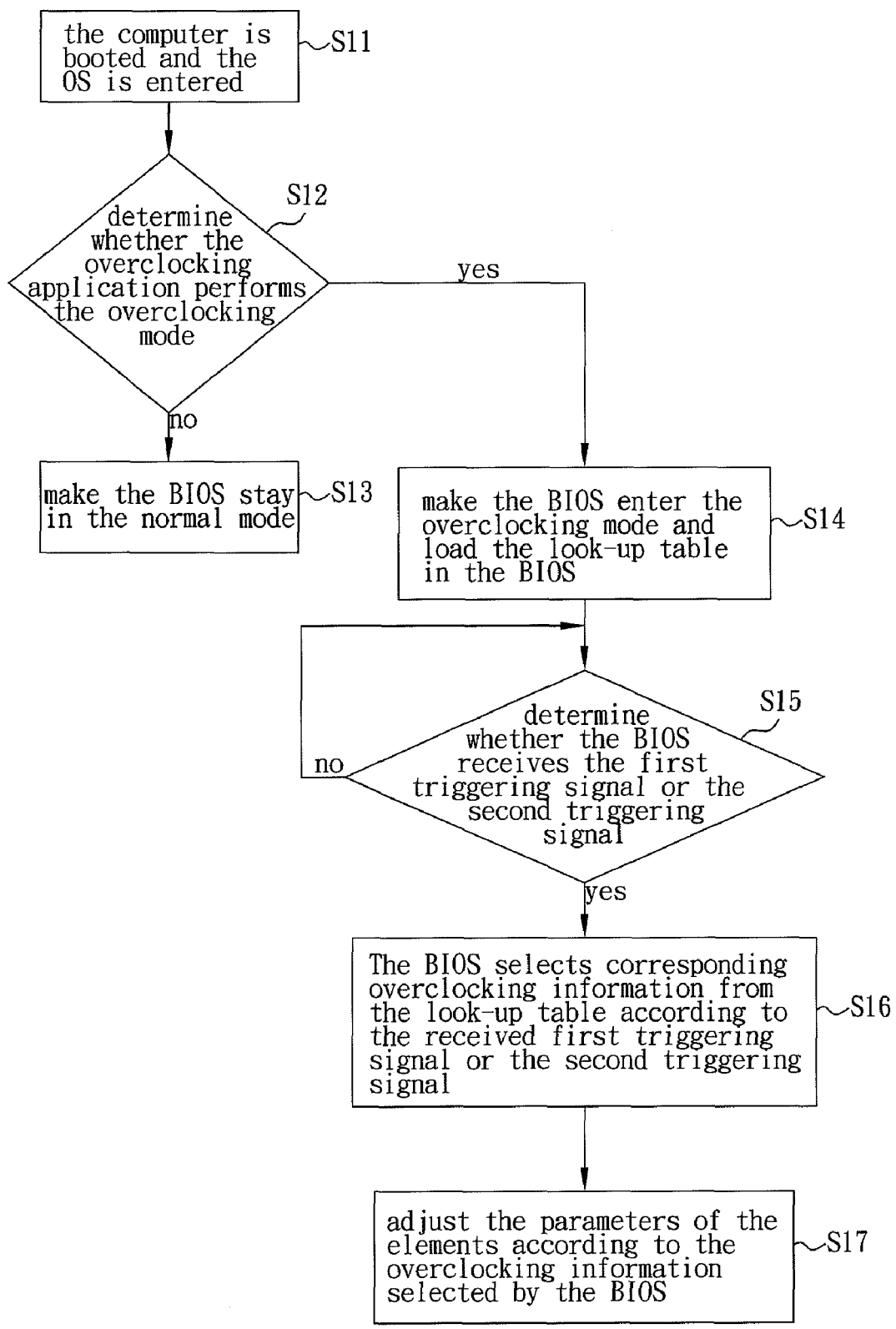
FIG. 4 is a detailed flow chart showing the overclocking control device in a preferred embodiment of the invention.

Then, as shown in FIG. 4, the overclocking control method in a preferred embodiment of the invention is further illustrated. The overclocking control method herein includes the steps S11 to S17.

In step S11, the computer is booted and the OS is entered. In step S12, whether the overclocking application performs the overclocking mode is determined. When the overclocking application does not perform the overclocking mode, step S13 is performed. When the overclocking application performs the overclocking mode, step S14 is performed. In step S13, the BIOS is kept in the normal mode.

In step S14, the BIOS enters the overclocking mode, and the look-up table is loaded into the BIOS. In step S15, whether the BIOS receives the first triggering signal or the second triggering signal is determined. When the BIOS does not receive the first triggering signal or the second triggering signal, step S15 is performed continuously. When the BIOS receives the first triggering signal or the second triggering signal, step S16 is performed.

In step S16, the BIOS selects the corresponding overclocking information from the look-up table and loads the overclocking information into the register of the BIOS according to the received first triggering signal or the second triggering signal. In step S17, the parameters of the elements are adjusted according to the overclocking information selected by the BIOS.

In the embodiment, when the BIOS enters the overclocking mode, a light emitting diode (LED) on the main frame of the computer may be used to show the user the current working state (whether the computer is in the normal mode or the overclocking mode) by light change. For example, the BIOS may control the shining times or the shining frequency of the LED via the south bridge chip, and it is not limited.

To sum up, in the overclocking control device and the overclocking control method of the invention, the overclocking application is executed under the OS, and the user may press the power button or the reset button to make the BIOS control the overclocking of the computer system after the computer system booted. In addition, the BIOS may select the overclocking information in the look-up table according to the number of times or frequency of pressing the power button or the reset button on the computer casing by the user to adjust the parameters. Thus, the user does not need to be familiar with the adjusting ranges of the parameters in overclocking the computer system. In addition, the user may directly set the overclocking by the power button, the reset button or other keys (such as the keyboard) to increase the convenience.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An overclocking control method cooperating with an overclocking application when the overclocking application is started, the overclocking control method comprising the steps of:
    a BIOS entering an overclocking mode according to an executing state of the overclocking application;
    receiving a first triggering signal outputted from a south bridge chip by the BIOS, wherein the first triggering signal is generated by the south bridge chip according to the operation of a first button; and
    selecting a piece of corresponding overclocking information from a look-up table and loading the overclocking information in a register of the BIOS according to the first triggering signal by the BIOS,
    when the overclocking application is not started, and the first button outputs a first signal, the BIOS works in a normal mode, the BIOS receives a first signal from the south bridge chip according to the first signal,
    when the overclocking application is started, and the first button outputs a first triggering signal, the BIOS works in the overclocking mode, the BIOS receives the first triggering signal outputted from the south bridge chip according to the number of the receiving times and frequency of the received first triggering signal, and executing an overclocking function.

2. The control method according to claim 1, wherein the overclocking information has at least a piece of working frequency information and a piece of working voltage information.

3. The control method according to claim 1, further comprising:
    receiving a second triggering signal outputted from the south bridge chip by the BIOS, wherein the second triggering signal is generated by the south bridge chip according to the operation of a second button; and
    selecting a piece of corresponding overclocking information from the look-up table and loading the overclocking information in the register of the BIOS according to the second triggering signal by the BIOS.

4. An overclocking control device cooperating with an overclocking application, the overclocking control device comprising:
    a first button;
    a south bridge chip electrically connected to the first button and generating a first triggering signal according to the operation of the first button; and
    a BIOS electrically connected to the south bridge chip and having a normal mode and an overclocking mode,
    when the overclocking application is not started, and the first button outputs a first signal, the BIOS works in a normal mode, the BIOS receives a first signal from the south bridge chip and control a computer according to the first signal,
    wherein when the overclocking application is started to make the BIOS work in the overclocking mode, and the south bridge outputs a first triggering signal, the BIOS receives the first triggering signal outputted from the south bridge chip according to the number of the receiving times and frequency of the received first triggering signal, selects a piece of corresponding overclocking information in a look-up table according to the first triggering signal and loads the overclocking information into a register of the BIOS, and executing a overclocking function.

5. The control device according to claim 4, wherein the register stores the overclocking information as the look-up table.

6. The control device according to claim 4, wherein the overclocking information has at least a piece of working frequency information and a piece of working voltage information.

7. The control device according to claim 4, further comprising a second button electrically connected to the south bridge chip, wherein the south bridge chip generates a second triggering signal according to the operation of the second button.

8. The control device according to claim 7, wherein the BIOS selects a piece of corresponding overclocking information from the look-up table according to the second triggering signal and loads the overclocking information into the register of the BIOS.

* * * * *